US012688601B2

(12) United States Patent
    Baumberg

(10) Patent No.: US 12,688,601 B2
(45) Date of Patent: Jul. 21, 2026

(54) DEVICE, COMPUTER PROGRAM AND METHOD

(71) Applicants: Sony Group Corporation, Tokyo (JP);
    Sony Europe B.V., Surrey (GB)

(72) Inventor: Adam Baumberg, Guildford (GB)

(73) Assignees: SONY EUROPE BV, Surrey (GB);
    Sony Group Corporation, Tokyo (JP)

( * ) Notice: Subject to any disclaimer, the term of this patent is extended or adjusted under 35 U.S.C. 154(b) by 281 days.

(21) Appl. No.: 18/409,985

(22) Filed: Jan. 11, 2024

(65) Prior Publication Data

US 2025/0232464 A1      Jul. 17, 2025

(51) Int. Cl.
    *G06T 7/70*      (2017.01)
    *G06T 7/13*      (2017.01)
    *G06V 10/74*     (2022.01)
    *G06V 20/40*     (2022.01)

(52) U.S. Cl.
    CPC .................. *G06T 7/70* (2017.01); *G06T 7/13* (2017.01); *G06V 10/761* (2022.01); *G06V 20/41* (2022.01); *G06T 2207/30221* (2013.01); *G06V 2201/07* (2022.01)

(58) Field of Classification Search
    CPC . G06T 7/70; G06T 2207/30221; G06V 20/41; G06V 2201/07
    See application file for complete search history.

(56) References Cited

U.S. PATENT DOCUMENTS

| | | | | |
|---|---|---|---|---|
| 2013/0120582 A1* | 5/2013 | Daniels | ..................... | G06T 5/80 |
| | | | | 348/157 |
| 2022/0284625 A1* | 9/2022 | Tuxen | ..................... | G06V 10/74 |
| 2022/0284628 A1* | 9/2022 | Tuxen | .................. | H04N 23/695 |
| 2022/0415016 A1* | 12/2022 | Kohler | ..................... | G06T 7/536 |

OTHER PUBLICATIONS

Criminisi, Antonio, Ian Reid, and Andrew Zisserman. "Single view metrology." International Journal of Computer Vision 40, No. 2 (2000): 123-148. (Year: 2000).*
Guo, F. (2007). Calibration and metrology using still and video images. University of Maryland, College Park. (Year: 2007).*
Gade, Rikke, Michele Merler, Graham Thomas, and Thomas B. Moeslund. "The (computer) vision of sports: Recent trends in research and commercial systems for sport analytics." Computer Vision (2024): 296-311. (Year: 2024).*

* cited by examiner

*Primary Examiner* — Stephen R Koziol
*Assistant Examiner* — Ashley Hytrek
(74) *Attorney, Agent, or Firm* — Tucker Ellis LLP

(57)      ABSTRACT

A method, computer program and device is described that obtains a first image of a sporting event, the first image containing a sporting projectile at a first pixel position and a first and second line separated by a predetermined real-world distance in a direction; establishes the number of pixels between the first and second line in the direction; establishes a real-world distance represented by a pixel in the direction; establishes the number of pixels between the first pixel position and the first line in the direction; and determines the real-world position of the sporting projectile in the sporting event in accordance with the established real-world distance and the number of pixels between the first pixel position and the first line.

15 Claims, 14 Drawing Sheets

900

1000

DEVICE, COMPUTER PROGRAM AND METHOD

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In sports events, it is desirable to detect the position of a ball or other sporting projectile. In order to do this, it is possible to install specific cameras which are calibrated to the specific field of play. However, as additional hardware is required, this increases the cost of such a system. It would be therefore desirable to detect the position of the sporting projectile using the broadcast feed.

It is an aim of the disclosure to address this issue.

SUMMARY

According to a first aspect of the disclosure, there is provided method comprising: obtaining a first image of a sporting event, the first image containing a sporting projectile at a first pixel position and a first and second line separated by a predetermined real-world distance in a direction; establishing the number of pixels between the first and second line in the direction; establishing a real-world distance represented by a pixel in the direction; establishing the number of pixels between the first pixel position and the first line in the direction; and determining the real-world position of the sporting projectile in the sporting event in accordance with the established real-world distance and the number of pixels between the first pixel position and the first line.

According to a second aspect of the disclosure, there is provided a method comprising: obtaining a first image of a sporting event, the first image being a perspective view containing a sporting projectile at a first pixel position and a first, second and third line each separated by a predetermined real-world distance in a direction; establishing the number of pixels between the first and second line and the first and third line in the direction; establishing the number of pixels between the first pixel position and the first line in the direction; and determining the real-world position of the sporting projectile in the sporting event in accordance with $$x = \frac{(A''C'' \cdot A''D'')(1 - y)}{A''C'' - yA''D''}$$

Where A"C" is the real-world distance between the first and second line and A"D" is the real-world distance between the first and third line and y=(AC·BD)/(BC·AD) where AC is the number of pixels between the first and second line; BD is the number of pixels between the first pixel position and the third line; BC is the number of pixels between the first pixel position and the second line and AD is the number of pixels between the first line and the third line.

According to a third aspect of the disclosure, there is provided a device comprising circuitry configured to: obtain a first image of a sporting event, the first image containing a sporting projectile at a first pixel position and a first and second line separated by a predetermined real-world distance in a direction; establish the number of pixels between the first and second line in the direction; establish a real-world distance represented by a pixel in the direction; establish the number of pixels between the first pixel position and the first line in the direction; and determine the real-world position of the sporting projectile in the sporting event in accordance with the established real-world distance and the number of pixels between the first pixel position and the first line.

According to a fourth aspect of the disclosure, there is provided a device comprising circuitry configured to: obtain a first image of a sporting event, the first image being a perspective view containing a sporting projectile at a first pixel position and a first, second and third line each separated by a predetermined real-world distance in a direction; establish the number of pixels between the first and second line and the first and third line in the direction; establish the number of pixels between the first pixel position and the first line in the direction; and determine the real-world position of the sporting projectile in the sporting event in accordance with $$x = \frac{(A''C'' \cdot A''D'')(1 - y)}{A''C'' - yA''D''}$$

Where A"C" is the real-world distance between the first and second line and A"D" is the real-world distance between the first and third line and y=(AC·BD)/(BC·AD) where AC is the number of pixels between the first and second line; BD is the number of pixels between the first pixel position and the third line; BC is the number of pixels between the first pixel position and the second line and AD is the number of pixels between the first line and the third line.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

3

Figure 1A:
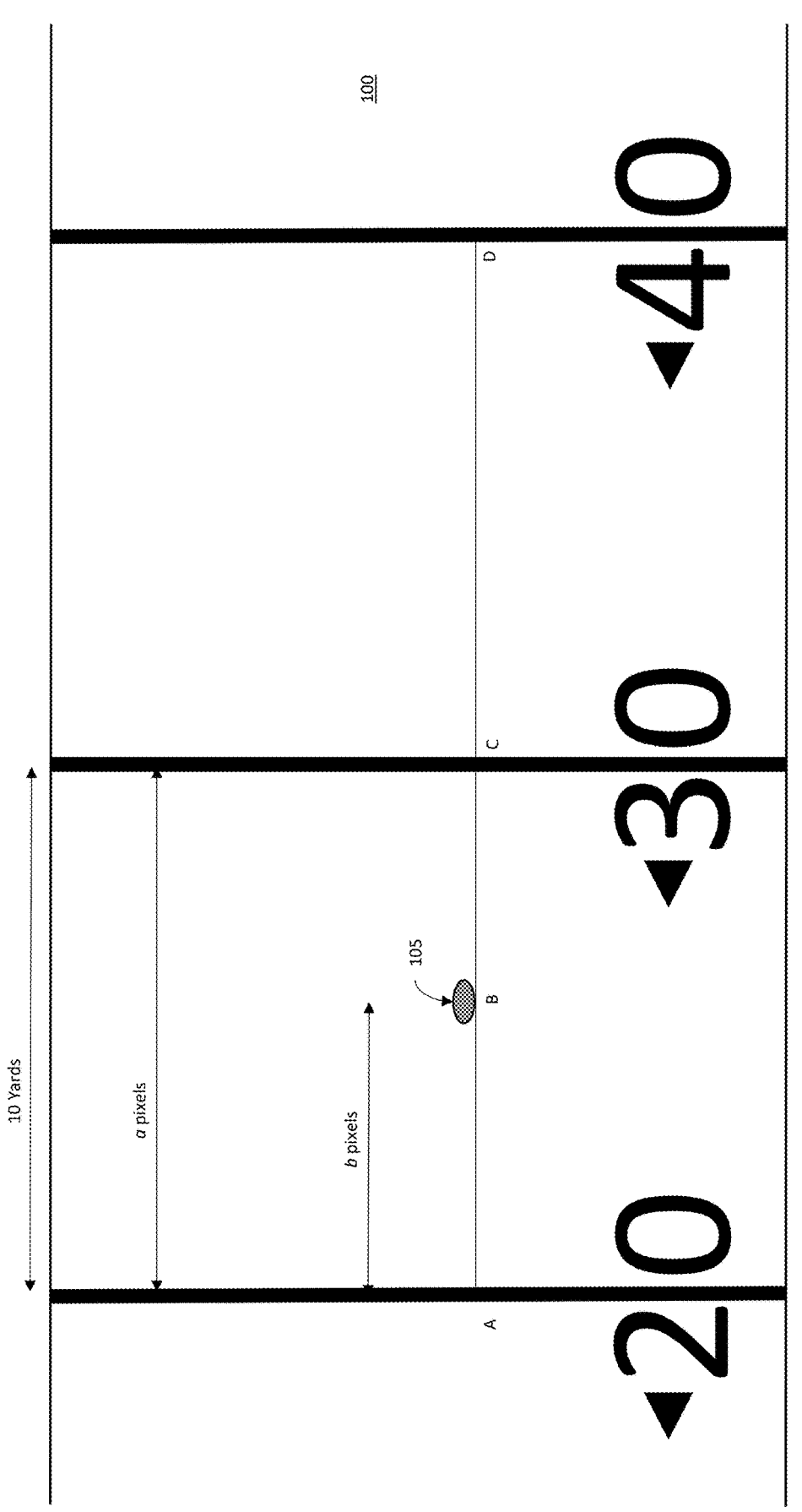
FIG. 1A shows a first overhead broadcast image view of an American Football field 100 having a ball 105 located on it.
Figure 5:
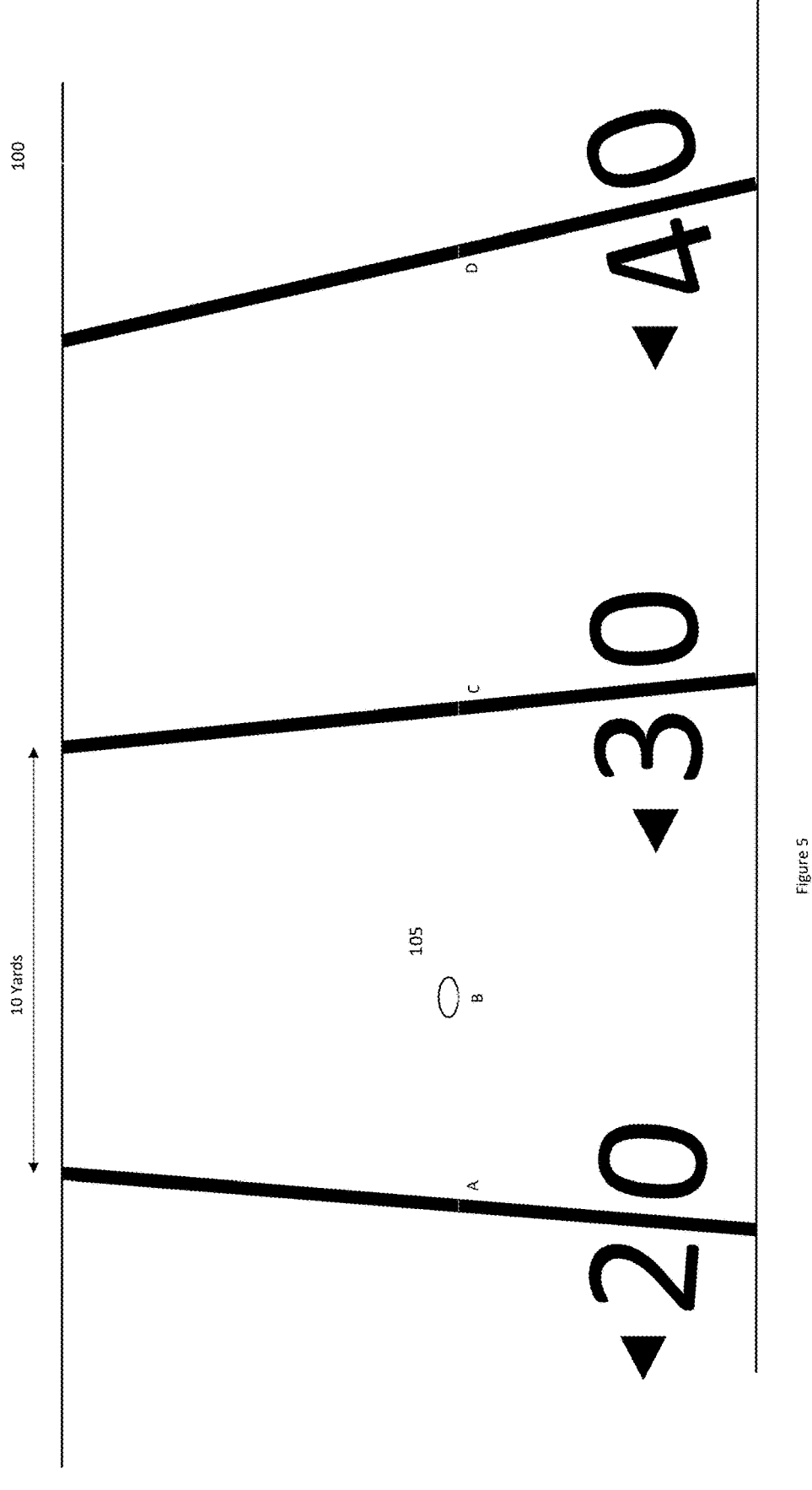
Figure 6:
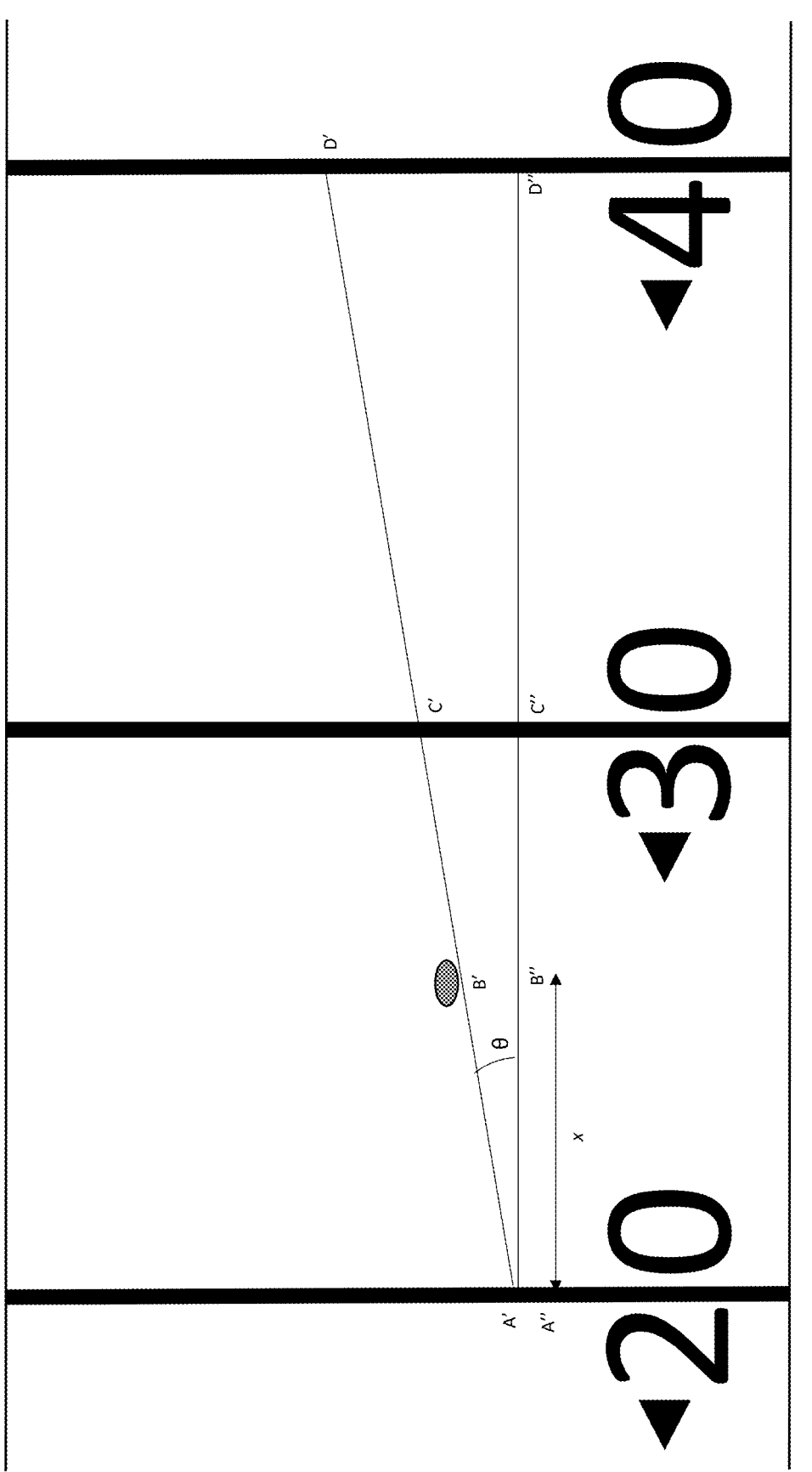
Figure 7:
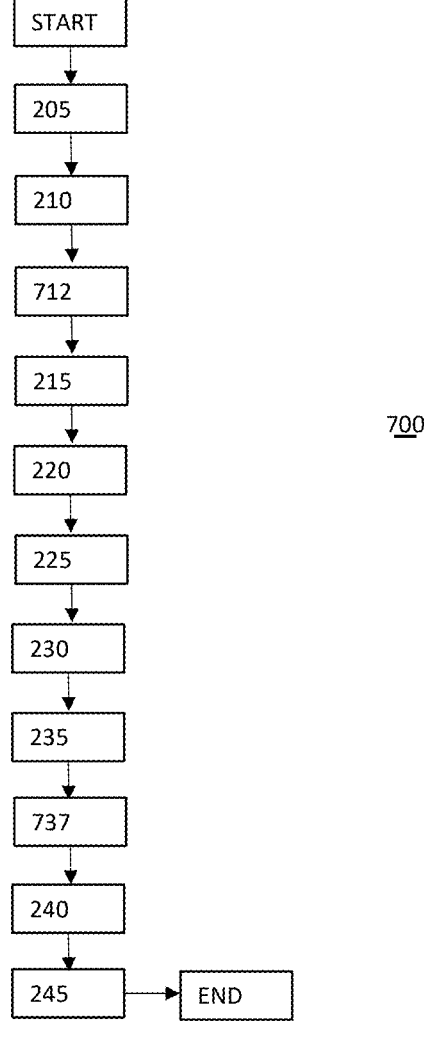
Figure 8:
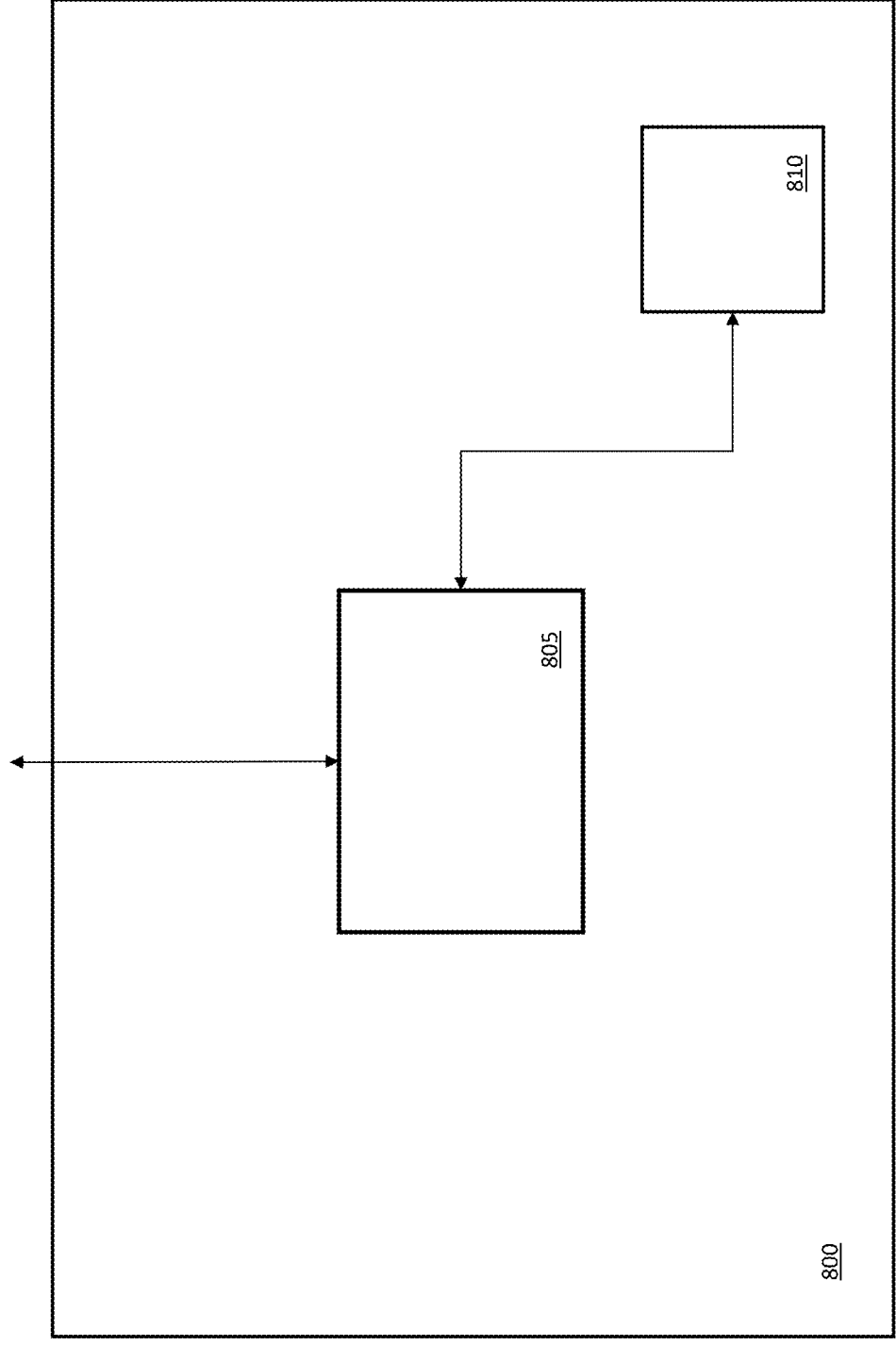
Figures 9, 10:
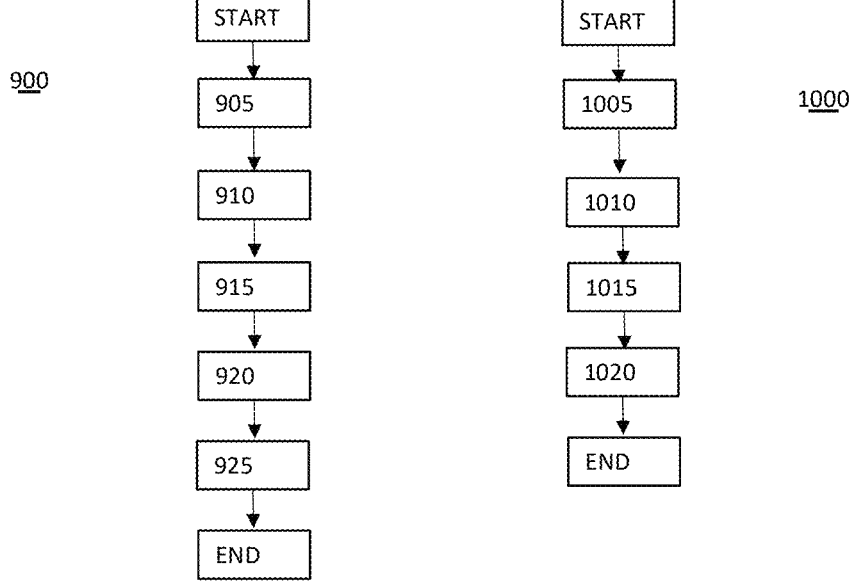

FIG. 4A to 4E shows a Graphical User Interface (GUI) 400 according to embodiments of the disclosure;

FIG. 5 shows a perspective view of the field shown in FIG. 1A;

FIG. 6 shows an overhead view of the perspective image of FIG. 5 and explains how the real-world position of the ball is determined according to embodiments;

FIG. 7 shows a process carried out by the device according to embodiments to determine the position of the ball on the field when the broadcast image is a perspective shot having non-parallel Yard Lines;

FIG. 8 shows a device according to embodiments of the disclosure;

FIG. 9 shows a process 900 performed according to embodiments; and

FIG. 10 shows a process 1000 performed according to embodiments.

DESCRIPTION OF THE EMBODIMENTS

Referring now to the drawings, wherein like reference numerals designate identical or corresponding parts throughout the several views.

Numerous modifications and variations of the present disclosure are possible in light of the above teachings. It is therefore to be understood that within the scope of the appended claims, the disclosure may be practiced otherwise than as specifically described herein.

FIG. 1A shows a first overhead broadcast image view of an American Football field 100 having a ball 105 located on it. The ball 105 is located between the 20 and 30 yard line (with the end zone (not shown) being to the left of the Figure). The following explanation will be described with reference to American Football (hereinafter "football") but the disclosure is not limited to football and any sports event is envisaged. Moreover, the following explanation will be described with reference to the position of the ball but the disclosure is not so limited and the position of any object on the pitch or sporting projectile is envisaged.

As will be appreciated, in football, Yard Lines extend across the pitch and are identified with numbers painted either side of the Yard Line. As noted in FIG. 1 and as appreciated, these Yard Lines are separated in the real world by 10 yards. In other words, the lines are separated on the field of play by a predetermined real-world distance. Of course, a football field has other markings such as hash marks and marks identifying the line of scrimmage for a two-point conversion attempt and a mark identifying where kickoffs should take place. However, for clarity of disclosure these markings are not shown in FIG. 1.

In football, a team gets possession of the ball and the ball is spotted (i.e. its position noted) and the offense has a first down. The offense must advance the ball downfield at least 10 yards in four downs in order to retain possession of the ball by the awarding of another first down. It is therefore desirable to measure the distance moved by the ball each down as accurately and quickly as possible to determine whether a ball has advanced 10 yards within the four downs.

In the broadcast feed, the Yard Lines separated by a certain number of pixels in the horizontal direction (as the broadcast view is an overhead view and so the Yard Lines are parallel to one another). In the example of FIG. 1A, this separation is a pixels. Accordingly, it is possible to map the real-world distance covered by one pixel. Specifically, the real-world distance covered by one pixel is 10/a yards.

If we assume that the position of the ball 105 is b pixels from the 20 yard line in the horizontal direction (i.e. along line ABCD), it is possible to determine the real-world position of the ball 105 on the football pitch 100 in this particular frame. Specifically, the ball is located at:

$$20 + \left( b \times \frac{10}{a} \right) \tag{1}$$

Therefore, it is possible to determine the real-world position of the ball 105 obtaining an image of the football game which includes the ball at a first pixel position and the two Yard Lines separated by 10 yards in the horizontal direction. This is achieved by establishing the number of pixels between the two lines in the horizontal direction, mapping the real-world distance represented by a pixel in the horizontal direction, establishing the number of pixels between the first pixel position and one of the two lines in the horizontal direction; and determining the real-world position of the ball 105 in accordance with the mapped real-world distance and the number of pixels between the first pixel position and one of the two lines.

Figure 1B:
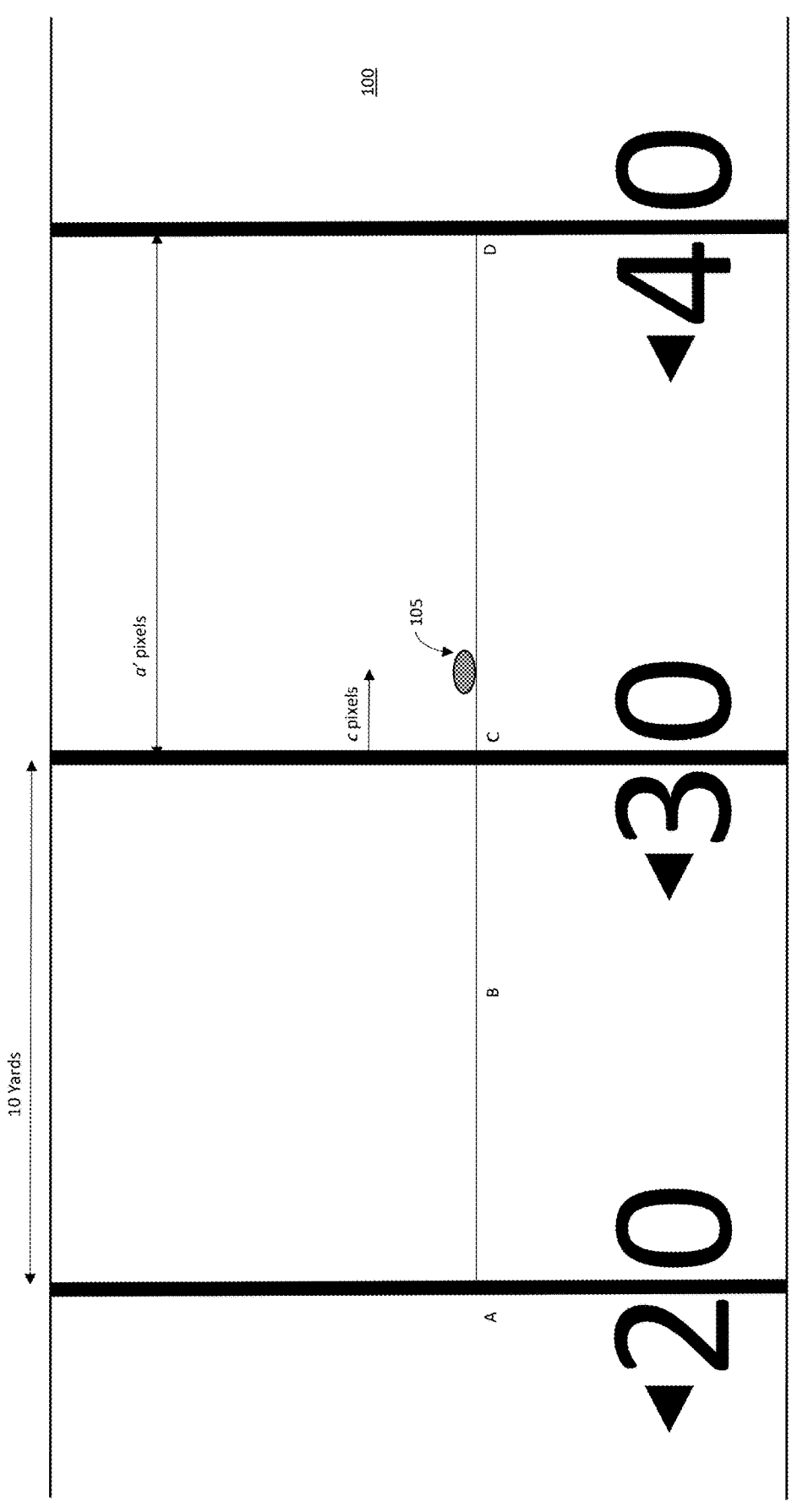
FIG. 1B shows a second overhead broadcast image view of the Football field 100 after the ball 105 has moved a distance during the first down.

FIG. 1B shows a second overhead broadcast image view of the Football field 100 after the ball 105 has moved a distance during the first down. The ball has moved beyond the 30 yard Yard Line. As noted above, we know that the real-world horizontal distance between the Yard Lines is 10 yards. In this frame, however, the focal length of the camera capturing the overhead view may have changed from that captured in FIG. 1A which would affect the real-world distance covered by one pixel. In this case, the real-world distance covered by one pixel is 10/a' yards.

If we assume that the position of the ball 105 is c pixels from the 30 yard line in the horizontal direction (i.e. along line ABCD), it is possible to determine the real-world position of the ball 105 on the football pitch 100 in this particular frame. Specifically, the ball is located at:

$$30 + \left( c \times \frac{10}{a'} \right) \tag{2}$$

The horizontal distance moved by the ball 105 in that down is therefore the difference between (2) and (1). In other words, the horizontal distance moved by the ball 105 is the difference between the ball position detected in the second broadcast image and the ball position in the first broadcast image.

Figure 2:
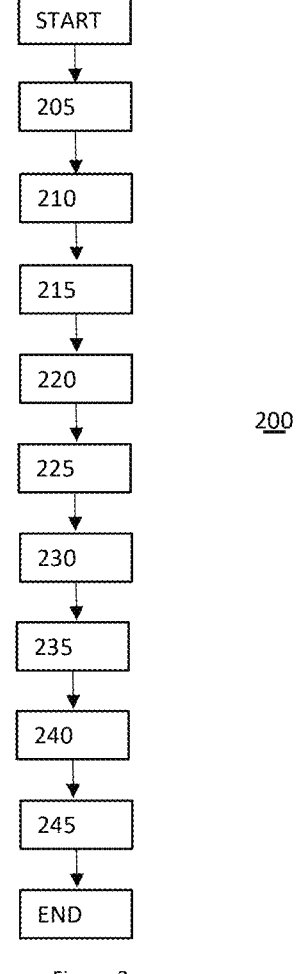
FIG. 2 shows a flow chart explaining the process 200 for detecting the position of the ball 105 in the first overhead image.

FIG. 2 shows a flow chart explaining the process 200 for detecting the position of the ball 105 in the first overhead image. In embodiments, the process 200 is carried out on every frame, although the disclosure is not so limited and may be carried out on every other frame or at any appropriate interval. It should be noted that the overhead image is assumed to have parallel lines on the field of play. In other words, there is an assumption in the first and second image of FIGS. 1A and 1B that there is no perspective element. The process associated with perspective will be explained later.

Returning to FIG. 2, the process 200 begins and moves to step 205. In step 205, the digits on the field of play are detected. In particular, the numerals and arrows identifying the direction of the respective end-zones are detected in the image. These may be detected using a machine learning neural network or other form of character recognition.

The process then moves to step 210 where lines are detected in the image. Specifically, the image is pre-processed using a difference of Gaussian. As will be appreciated, the difference of Gaussian enhances the visibility of edges in an image. This pre-processing therefore makes the lines easier to detect. In embodiments, radial distortion effects are mitigated by applying a known simple lens model to the image that assumes the centre of distortion is at the centre of the image. A Hough Transform is then used to detect the lines in the image. In embodiments, the Hough Transform may be optimised to handle prevailing weather conditions. For example, the Hough Transform may be optimised to handle snowy fields or fields in bright sunshine.

In order to distinguish the Yard Lines from any other detected lines, a characteristic of the lines are used. In embodiments, the length of the lines are used. This is because the Yard Lines are the longest lines in the pitch width direction.

In embodiments, the thickness of the lines could be used. In particular, Yard Lines are thicker than any other line on the field of play.

Of course, other characteristics such as the Yard Lines being parallel in embodiments may be used. For example, a pair of randomly selected lines may be selected and a 2D intersection of those lines found. Where there are lines without an intersection, these will be parallel. The distance between these lines is checked and where a similar number of pixels occur between the lines, these will be repeating lines. The thickness of those lines in the horizontal direction is then checked and the thickest of those lines will be deemed the Yard Lines. The process moves to step 215.

As there is assumed to be parallel Yard Lines, each detected Yard Line is labelled with its corresponding detected numeral and arrow. In other words, each Yard Line is uniquely identified using a combination of the detected numeral and the arrow. In the instance where other lines are detected and used (for example some football fields include a 5 Yard Line or the one yard hash marking), another unique label may be used identifying the line. This unique label may be created using the nearest Yard Line with a detected numeral and arrow or may be created randomly.

The process moves to step 220 where the detected and labelled lines are tracked across frames. In other words, as, in embodiments, the Yard Lines in each frame are detected, it is possible to retain the labelling of each line across all frames. When a new Yard Line is detected this is labelled and subsequently tracked. In embodiments, where no numerals on a newly detected Yard Line are detected, the newly captured Yard Line is labelled using its proximity to the nearest Yard Line that is labelled.

The process moves to step 225 where the tracked lines and labels are stored for each frame. This means that each frame of the broadcast feed has the Yard Lines identified and a unique label for each of those Yard Lines. In embodiments, the following steps are then only performed under the control of the user. In particular, steps 230, 235, 240 and 245 are carried out when instructed by a user. For example, in embodiments, steps 230, 235, 240 and 245 are carried out when confirmation of a first down is required. This reduces computational burden as the processes 230, 235, 240 and 245 are computationally expensive. However, of course, the disclosure is not so limited and each of step 230, 235, 240 and 245 may be carried out on every frame.

In this instance, the process moves to step 230 where a user recalls a particular frame for analysis. This particular frame may be identified when a particular down is called. For example, when the down marker changes the displayed down, the frame of the broadcast feed may be marked as a 'first down', 'second down' etc. image. Of course, the disclosure is not so limited and a manual mark may be applied to the image which shows where the ball is located on a particular down or the user may be simply free to choose any frame which they feel best illustrates the location of the ball on any particular down.

Anyway, once the frame is retrieved, the detected Yard Lines and the unique identification for each Yard Line are also retrieved. The process then moves to step 235 where ball detection is carried out on the image. Although it is possible to automatically perform ball detection in the whole frame, in embodiments, the user may highlight the ball in the frame. The position of the ball is then determined as will be described in more detail in FIG. 3.

Figure 3:
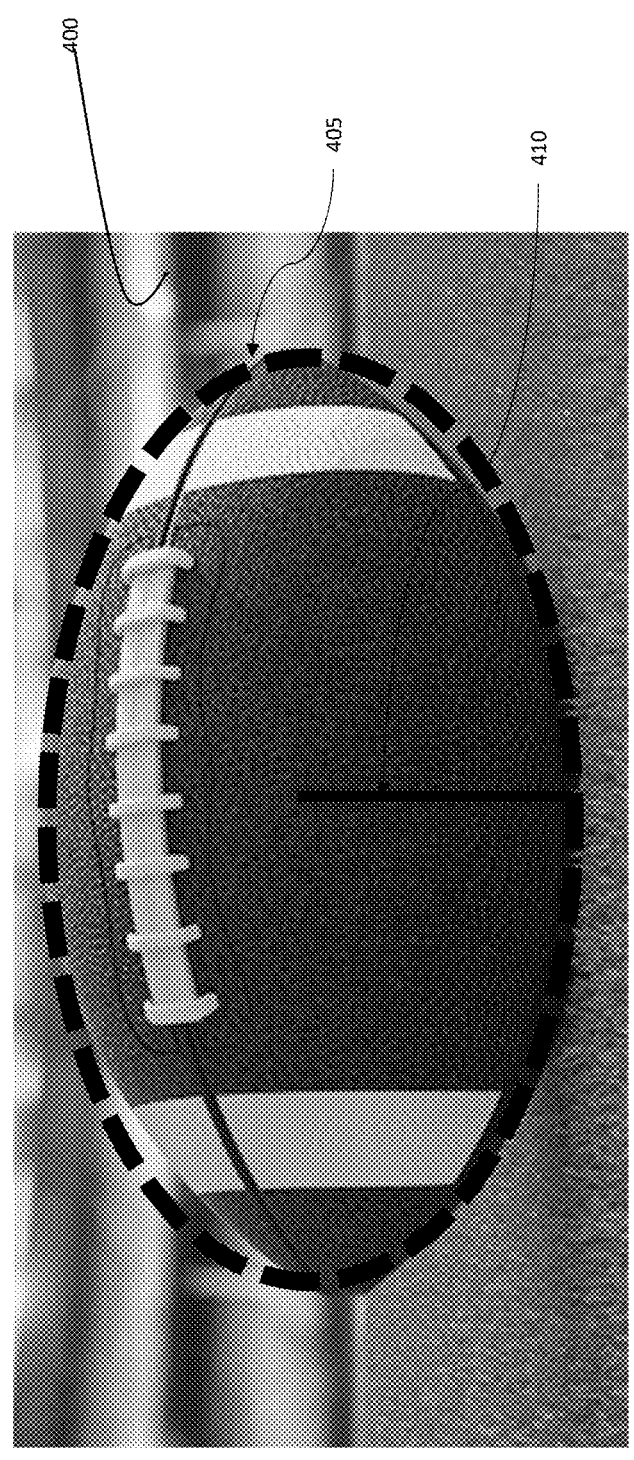
FIG. 3 shows a picture 400 of a ball.

FIG. 3 shows a picture 400 of a ball. As would be appreciated, the ball covers many pixels and so the pixel position of the location of the ball must be established in each image. This is achieved by performing ball detection on each image using a known ball detection technique. Once the ball is detected in the image, an ellipse 405 is fitted to the ball. In other words, an ellipse 405 is fitted to the outline of the ball. The centre of the ellipse 405 is then determined using known techniques. The point touching the ground on the football field is where a vertical projection from the centre of the ellipse intersects the bottom edge of the ellipse (the bottom of the ellipse being the surface upon which the football game is played). This vertical projection 410 is shown in FIG. 3. The pixel position of the location of the ball is then established as the point intersecting the vertical projection and the surface.

Of course, the disclosure is not so limited. In embodiments, the pixel position is in pixel co-ordinates and may not be necessarily an integer pixel. In other words, the pixel positon may be measured to sub-pixel precision.

Moreover, although the above describes the pixel position as being the point intersecting the vertical projection from the centre of the ball and the surface, the disclosure is not so limited. For example, the pixel position may be any point such as the point a half ball away from the intersection or the like. In embodiments, the pixel position may be any point intersecting the vertical projection from any location on the ellipse and the surface.

Referring back to FIG. 2, after the location of the ball in the frame is established, the process moves to step 240. In step 240, the position of the ball is established. In order to achieve this, the labelled lines are read. A horizontal line connecting two Yard Lines and intersecting the pixel position of the location of the ball is determined. In other words, line ABCD of FIG. 1A and FIG. 1B is determined. The calculation of equation 1 and equation 2 is performed to determine the real life position of the ball. The distance the ball has moved in the horizontal direction can also be determined as explained with reference to FIGS. 1A and 1B.

Although the above indicates that a horizontal line connecting the two Yard Lines and intersecting the pixel position of the location of the ball is used, the disclosure is not so limited. In embodiments, the horizontal line is a scan line and by determining the scan line intersection with the Yard Lines using image information close to the scan line, rolling shutter effects can be mitigated where lines at the top of the image are captured at an earlier time to the lines at the bottom of the image. In order to mitigate rolling camera shutter, in embodiments, the scan lines are restricted to odd or even scan lines which reduces issues with an interlaced input.

The process then moves to step 245 where the position of the ball is sent to a Graphical User Interface (GUI) which is shown in FIGS. 4A to 4E. The use of the position of the ball will be described with reference to FIGS. 4A to 4E.

The process then ends.

FIG. 4A to 4E shows a Graphical User Interface (GUI) 400 according to embodiments of the disclosure.

The purpose of the GUI is to allow a device according to embodiments to determine whether a line to gain has been achieved. In embodiments, the device will generate a notification accordingly.

Figure 4A:
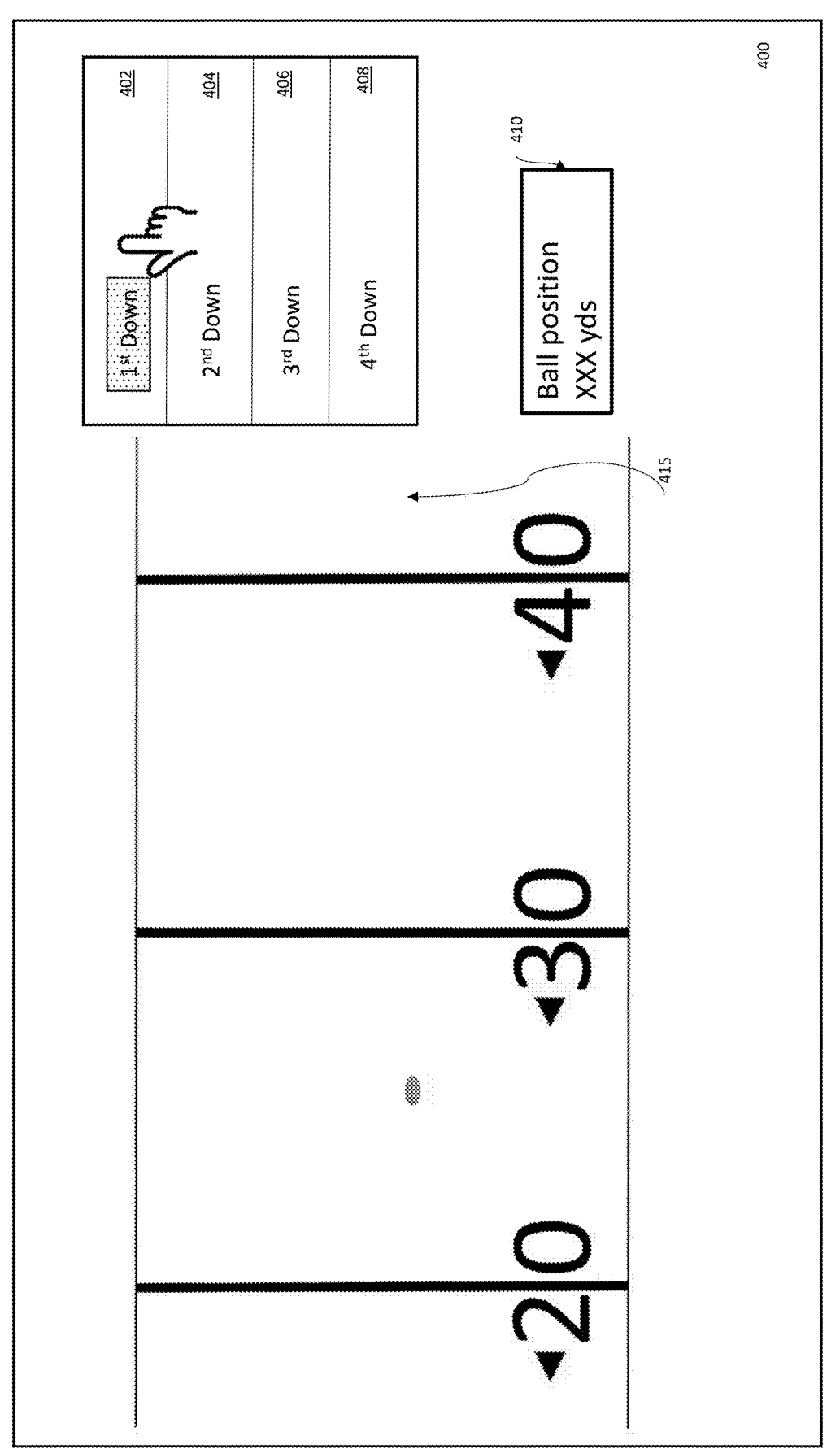
Figure 4B:
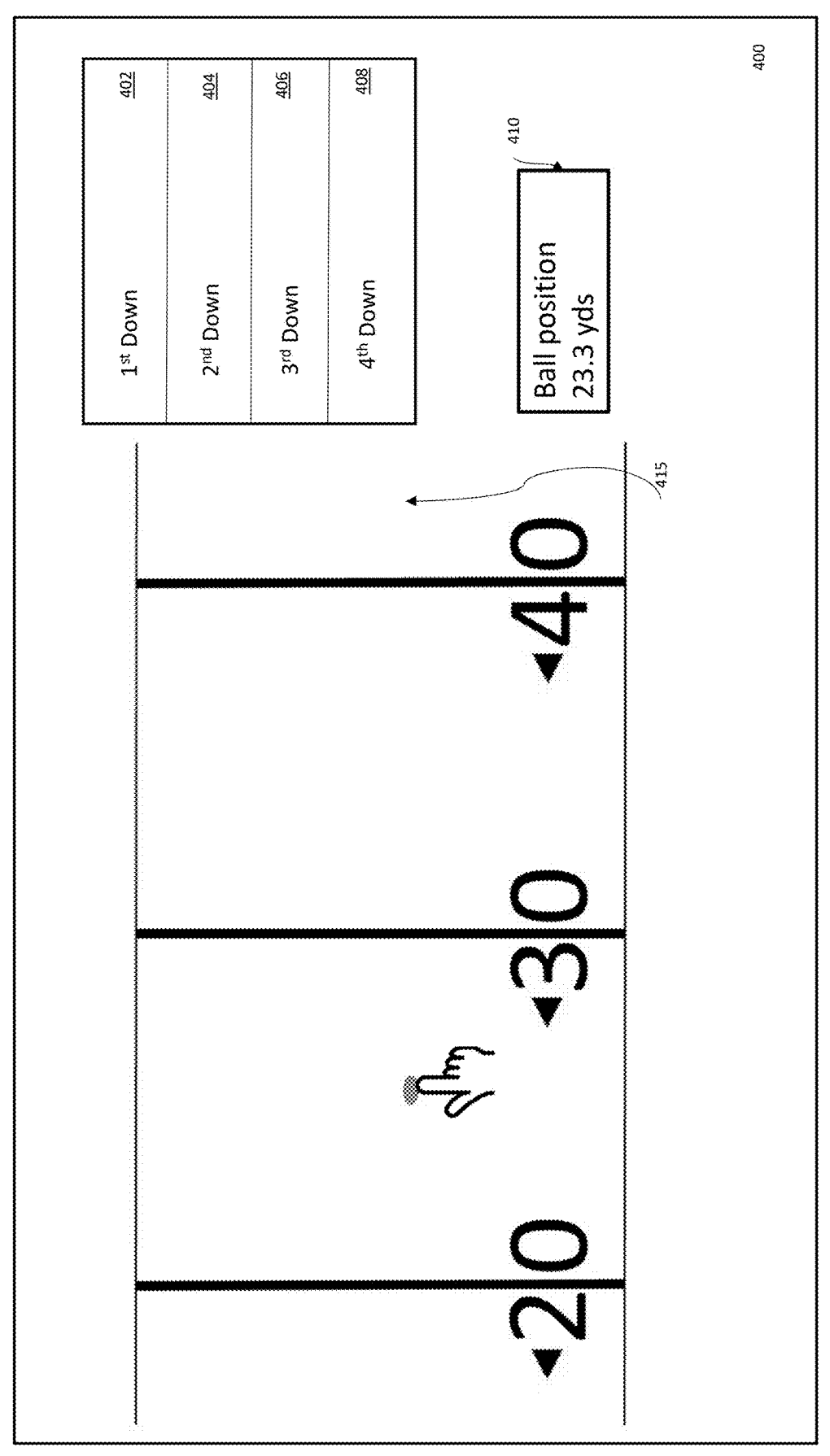

FIG. 4A shows the GUI where an image showing a first down is retrieved. In this case, the user of a device according to embodiments selects the "1$^{st}$ Down" button 402. This may be using a touch screen or a controller such as a mouse or via voice command or the like. In this case, the user touches the "1$^{st}$ Down" button 402. This indicates to the device that an image of a first down should be retrieved. The device according to embodiments reviews the stored frames and retrieves the frame with metadata indicating that the frame is a "1$^{st}$ Down" image. As noted above, the image has a first down marker applied to it in metadata so that easy retrieval of the image can be facilitated.

The user then reviews a broadcast feed image 415. The user then touches the ball located in the broadcast feed image (see FIG. 4B). The device performs the process of FIG. 2 and identifies the location of the ball on the field. This location is indicated in the graphic 410 (see FIG. 4B) at 23.3 yds. This location is stored so that a Line to Gain may be determined.

Figure 4C:
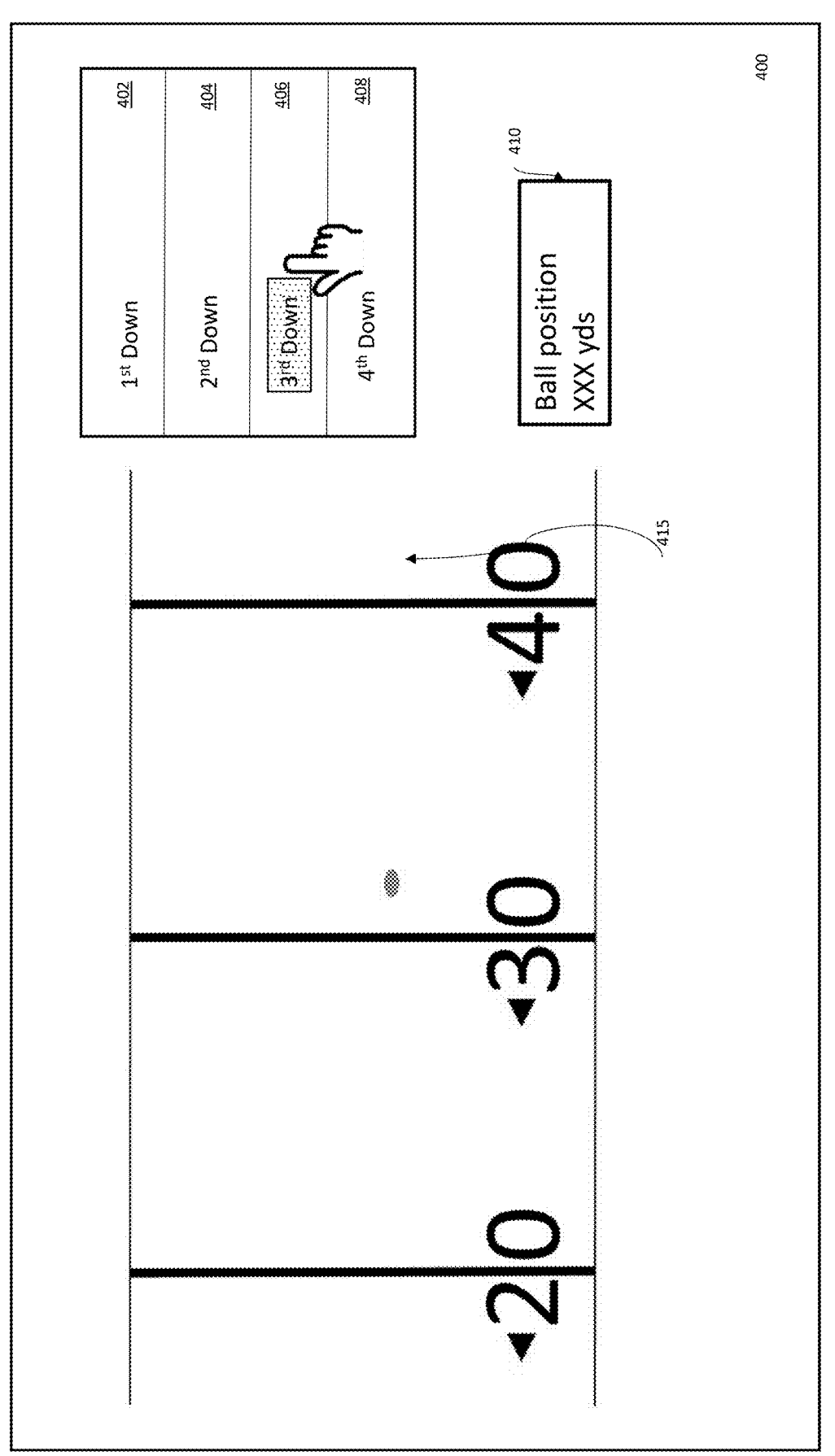

Referring now to FIG. 4C where the user is asked to see if the Line to Gain was reached. The user selects the down to check. In this case, the user selects the "3$^{rd}$ Down" button 406 in a similar manner to the selection of the "1$^{st}$ Down" button 402 in FIG. 4A. In other words, a second image of the sporting event is obtained. The user then reviews the broadcast feed image 415 and touches the ball located in the broadcast feed image. As is the case in FIG. 4B, the device performs the process of FIG. 2 and identifies the location of the ball on the field. In other words, the device performs the same process as explained with reference to FIG. 2 to establish the real-world position of the ball in the second image. This location is indicated in the graph 410 as 33.8 yards.

However, in embodiments, when any one of the "2nd Down" button 404, "3rd Down" button 406 or "4th Down" button 408 is pressed, the horizontal location of the ball the ball is automatically compared with the horizontal location of the ball in the "1st Down". In the event that the difference in horizontal location is equal to or greater than 10 yards, a prompt is provided on the screen indicating that a first down should be called. The device therefore determines the distance travelled by the ball between the first and second image in accordance with the difference between the real-world position of the ball in the first image and the real-world position of the ball in the second image.

Figure 4D:
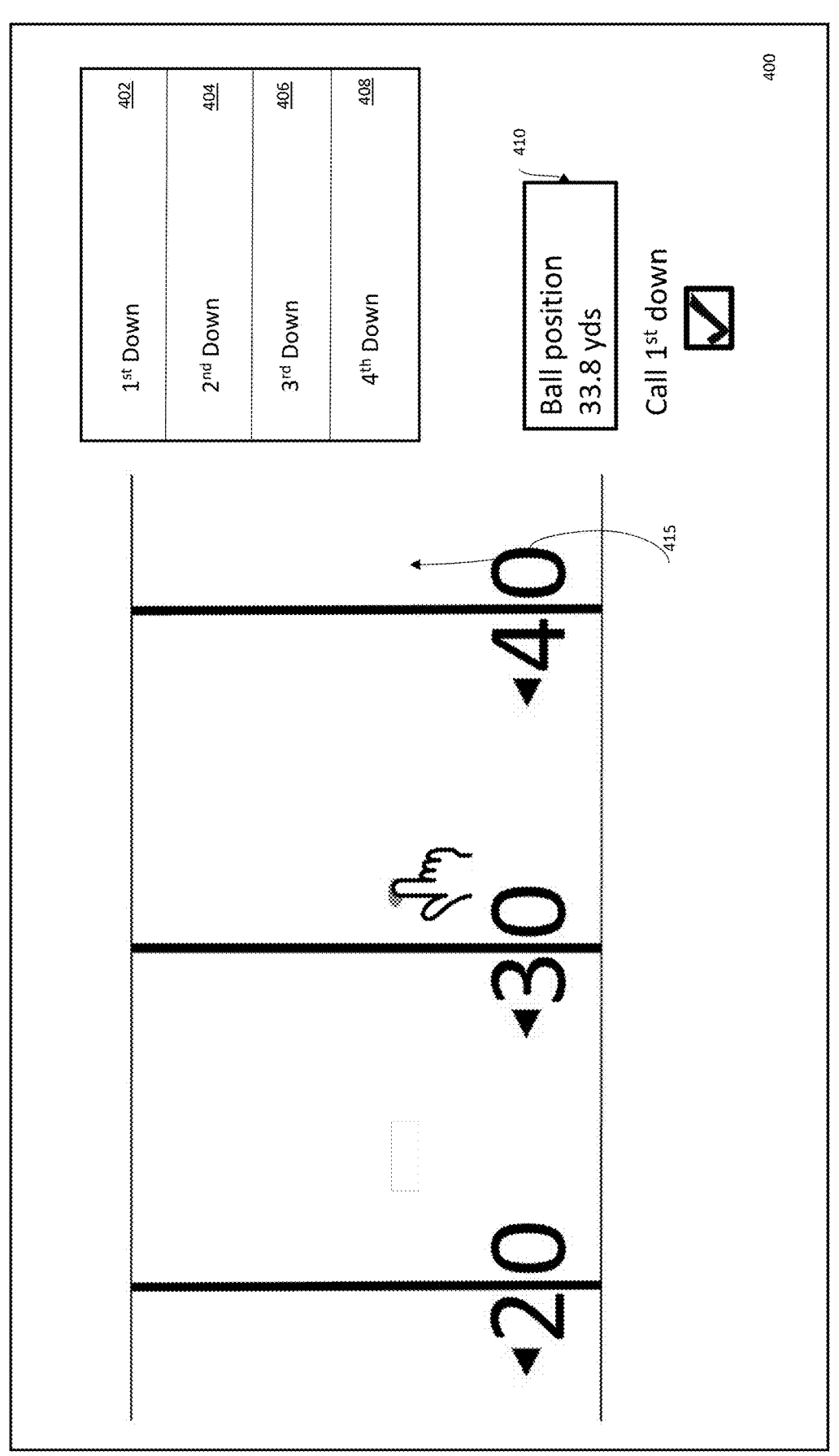
Figure 4E:
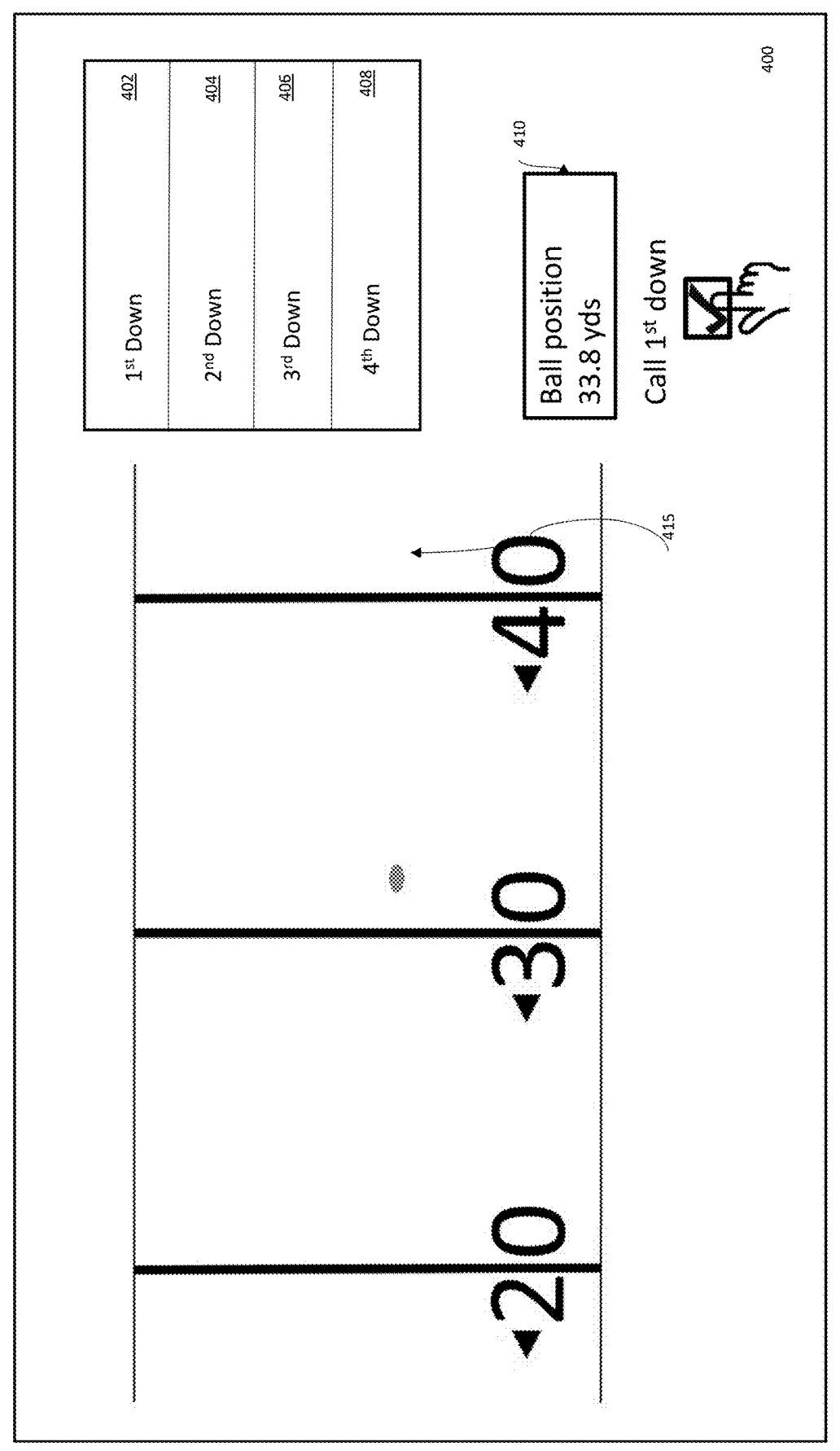

In other words, the Line to Gain has been achieved. In other words, the GUI which is provided by the device generates a notification when the distance travelled by the ball between the image of FIG. 4A and the image of FIG. 4C (the first and second image) is greater than or equal to a predetermined threshold, which is, in embodiments, 10 yards. In the embodiments of FIGS. 4C, 4D, and 4E, this notification is a "Call 1st down" button. The user of the device (who may be a referee for example), presses the provided button or icon which indicates to the on-field officials that a first down should be called as depicted in FIG. 4E. Accordingly, the user of the device has ultimate control over whether a first down is called.

In embodiments, the notification is sent to the broadcaster of the football match. The broadcaster may apply a graphic to the broadcast feed in response to the notification.

Further, the image having the first down may also have a graphic overlay applied to it; this graphic may be a line passing through the pixel position. A further line may be applied to the image indicating where the real-world position of the ball in the second image is. By providing the two lines on the same image (the first line indicating the real-world position of the ball in the first image and the second line indicating the real-world position of the ball in the second image) this will give a visual representation on one image of the movement of the ball.

The foregoing has been described with reference to an overhead broadcast feed image that has substantially parallel lines on the field. However, the disclosure is not so limited. Parallel lines may appear in broadcast images captured with a high degree of zoom.

Moreover, in many instances, the broadcast feed may include perspective shots with a lower degree of zoom. With a perspective view, the lines on the field are not parallel and so although on the real-life field, the Yard Lines are separated by 10 yards, the number of pixels separating the Yard Lines on the display varies across the width of the field. Embodiments of the disclosure address this issue.

FIG. 5 shows a perspective view of the field shown in FIG. 1A. As in FIG. 1A, the field 100 is shown with a 20, 30 and 40 Yard Line separated by 10 yards. The ball 105 is also shown on the field 100. Moreover, a horizontal line A→D is shown that intersects the 20 Yard Line, the location of the ball on the field, the 30 Yard Line and the 40 Yard Line. The intersections are labelled A, B, C, D respectively.

FIG. 6 shows an overhead view of the perspective image of FIG. 5 and explains how the real-world position of the ball is determined according to embodiments. In this view, the horizontal line A"→D" back projects to the non-horizontal line A'→D' (in this case on the 20 Yard Line). However, as we know that the Yard Lines in real-life are parallel, we can show that the ratios of lengths such as A'B'/A'D' are the same as the ratios for the points projected onto the horizontal line A"D". So, A'B/A'D'=A"B"/A"D" and similarly for other length ratios.

Using the Cross-Ratio theorem that states 4 colinear points under perspective project have a fixed cross-ratio $$(A, B, C, D) = \frac{AC \cdot BD}{BC \cdot AD} \qquad (3)$$

The cross ratio for A, B, C, D will be the same for A', B', C', D' as these are the same points under perspective projections and from the parallel lines argument above, these will be the same for A", B", C", D".

The points A, B, C, D in the perspective view image are known in pixel units. The distance between the Yard Lines A", C" and D" are also known. So, it is possible to calculate the unknown distance A"B" (noted as x on FIG. 6) using the invariant cross-ratio y.

$$y = (AC \cdot BD)/(BC \cdot AD) = (A''C'' \cdot B''D'')/(B''C'' \cdot A''D'') \qquad (4)$$

where $$A''C'' = 10;$$

-continued $$B''D'' = A''D'' - A''B'' = 20 - x;$$

$$B''C'' = A''C'' - A''B'' = 10 - x$$

$$A''D'' = 20$$

Rearranging equation (4) for x $$x = \frac{200(1-y)}{10-20y} \tag{5}$$

In this case x is the distance from the 20 yard line so the horizontal location of the ball is 20+x yards.

As would be appreciated, equation 5 assumes that the predetermined distance is 10 yards. However, the disclosure is not so limited. Accordingly, more generally, equation 5 can be written as $$x = \frac{2a^2 - 2a^2 y}{a - 2ay} \tag{6}$$

Where x is the real-world position; a is the first predetermined real-world distance in the direction; and y=(AC·BD)/(BC·AD) where AC is the number of pixels between the first and second line; BD is the number of pixels between the first pixel position and the third line; BC is the number of pixels between the first pixel position and the second line and AD is the number of pixels between the first line and the third line. It should be noted here that if the image edges of the lines are sub-pixel precision or fitted curves are applied to the lines (see below), then the sub-pixel horizontal line is intersected with the curve to get the real-value intersections in pixels units. The distance between these intersections is then measured.

In embodiments, if the Yard Lines are not equally spaced or an obstruction or the like means that consecutive Yard Lines are not detected, equation (6) may be written more generally as:

$$x = \frac{(A''C'' \cdot A''D'')(1-y)}{A''C'' - yA''D''} \tag{7}$$

Where A"C" is the real-world distance between lines A" and C" and A"D" is the real-world distance between lines A" and D" and y=(AC·BD)/(BC·AD) as above in respect of equation (6). This can be written as:

$$x = \frac{cd(1-y)}{(c-dy)} \tag{7}$$

Where c=A"C" and d=A"D".

FIG. 7 shows a process carried out by the device according to embodiments to determine the position of the ball on the field when the broadcast image is a perspective shot having non-parallel Yard Lines. Many of the steps of FIG. 2 are performed in the process of FIG. 7. For ease of understanding, like reference numerals will be used in FIG. 7 for the same steps and the description will be omitted.

The process starts and moves to step 205 where the digits on the field are detected. The process moves to step 210 where the lines are detected on the field. However, as the Yard Lines are now not parallel, after the Hough Transform is carried out, the process moves to step 712. In step 712, the vanishing point of all the detected lines is detected. This is done using a Random Sample Consensus (RANSAC) approach. In particular, random pairs of lines are selected and their 2D intersection point found. The hypothesized intersection point with the most number of lines that pass close to the point is kept and the lines that pass close to this vanishing point are stored. As the Yard Lines are parallel on the field, they will have a common vanishing point when viewed in a perspective view. The lines that have a common vanishing point are thus deemed to be Yard Lines.

The process then moves to step 215 where each Yard Line is labelled. The process moves to step 220 where the detected and labelled lines are tracked across frames. The process moves to step 225 where the tracked lines and labels are stored for each frame. The process moves to step 230 where a user recalls a particular frame for analysis. The process moves to step 235 where ball detection is carried out on the image. However, after the ball in the image is localised, the process moves to step 737. In step 737, the Yard Line is localised by fitting a spline curve to image edges near the initially detected line. The real-world position of the ball is then determined using the fitted spline curves. This is because the real-life field is not flat and so applying a spline curve increases the accuracy of the results in a perspective view. In embodiments, a curve model may also be fitted to image edges near the initially detected parallel lines. This would reduce lens distortion effects or a rolling shutter with an accelerating or decelerating camera motion.

The process then moves to step 240 where the position of the ball is established. As would be appreciated, rather than using the mechanism described with reference to FIGS. 1A and 1B, in FIG. 7, the cross ratio method explained with reference to FIG. 6 will be used instead. Moreover, where there is discussion of the intersection of the two Yard Lines in FIG. 2, in embodiments of FIG. 7, it is the intersection of the horizontal line with the fitted spline curve that is determined. The x position (i.e. position of the ball in the horizontal direction) that is calculated.

The process moves to step 245 where the position of the ball is sent to a Graphical User Interface and the process as explained with reference to FIGS. 4A to 4D is performed and the process then ends.

FIG. 8 shows a device according to embodiments of the disclosure. The device 800 comprises circuitry 805 that is configured to perform various method steps. The circuitry 805 is, in embodiments, a processor that runs using computer readable instructions. In embodiments, the circuitry 805 is an Application Specific Integrated Circuit or a microprocessor or the like. The device 800 also comprises storage 810 that is connected to the circuitry 805. In embodiments, the storage 810 is solid-state storage but the disclosure is not so limited. The storage 810 is also configured to store computer readable instructions which are used to control the circuitry 805 therein or thereon.

The device 800 is, in embodiments, connected to a user input device (such as a touch screen) to perform the method described with reference to FIGS. 4A to 4E and is connected to an output device to indicate to an on-field referee whether the Line to Gain has been achieved.

The accuracy of the process of FIG. 7 has been tested using the hash marker on a field. In preliminary tests, where the selection of the hash marker was made manually, a first hash marker was identified as being 1.005 yards to the right of a Yard Line. As the hash marker is measured to be 1 yard to the right of a Yard Line, this gives an absolute error of 0.2 inches.

Although the foregoing has been described with reference to Football, the disclosure is not so limited. In fact, any sporting event where there are two lines separated by a predetermined real-world distance in a direction is envisaged. For example, in a soccer match, the playing surface is typically mown to include lines in a particular direction. These lines are uniformly cut across the length of the playing surface and are separated by a specific distance determined by the ground staff maintaining the playing surface. In these embodiments, the soccer ball will be modelled as a circle (as the soccer ball is spherical).

Another example of a different sporting event is rugby where a 22 metre line and a 10 metre line are drawn a predetermined distance from the try line and the halfway line respectively. In rugby, the sporting projectile is a ball which can also be modelled as an ellipse.

FIG. 9 shows a process 900 performed according to embodiments.

The process starts and moves to step 905 where a step of obtaining a first image of a sporting event, the first image containing a sporting projectile at a first pixel position and a first and second line separated by a predetermined real-world distance in a direction is performed. The process moves to step 910 where a step of establishing the number of pixels between the first and second line in the direction is performed. The process then moves to step 915 where a step of establishing the real-world distance represented by a pixel in the direction is performed. The process moves to step 920 where a step of establishing the number of pixels between the first pixel position and the first line in the direction is performed. The process moves to step 925 where a step of determining the real-world position of the sporting projectile in the sporting event in accordance with the established real-world distance and the number of pixels between the first pixel position and the first line is performed. The process 900 then ends.

FIG. 10 shows a process 1000 performed according to embodiments.

The process starts and moves to step 1005 where a step of obtaining a first image of a sporting event, the first image being a perspective view containing a sporting projectile at a first pixel position and a first, second and third line each separated by a predetermined real-world distance in a direction is performed. The process moves to step 1010 where a step of establishing the number of pixels between the first and second line and the first and third line in the direction is performed. The process then moves to step 1015 where a step of establishing the number of pixels between the first pixel position and the first line in the direction is performed. The process then moves to step 1020 where a step of determining the real-world position of the sporting projectile in the sporting event in accordance with $$x = \frac{2a^2 - 2a^2 y}{a - 2ay}.$$

Where x is the real-world position;

a is the predetermined real-world distance in the direction; and y=(AC·BD)/(BC·AD) where AC is the number of pixels between the first and second line; BD is the number of pixels between the first pixel position and the third line; BC is the number of pixels between the first pixel position and the second line and AD is the number of pixels between the first line and the third line is performed.

In embodiments, if the Yard Lines are not equally spaced or an obstruction or the like means that consecutive Yard Lines are not detected, as noted above this equation may be written more generally as:

$$x = \frac{(A''C'' \cdot A''D'')(1 - y)}{A''C'' - yA''D''}$$

Where A"C" is the real-world distance between lines A" and C" and A"D" is the real-world distance between lines A" and D" and y=(AC·BD)/(BC·AD) as above.

This can be written as:

$$x = \frac{cd(1 - y)}{(c - dy)}$$

Where c=A"C" and d=A"D".

The process 1000 then ends.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A method comprising:
    obtaining a first image of a sporting event, the first image containing a sporting projectile at a first pixel position and a first and second line separated by a predetermined real-world distance in a direction;
    establishing the number of pixels between the first and second line in the direction;

establishing a real-world distance represented by a pixel in the direction;

establishing the number of pixels between the first pixel position and the first line in the direction; and determining the real-world position of the sporting projectile in the sporting event in accordance with the established real-world distance and the number of pixels between the first pixel position and the first line.

2. A method according to clause 1, further comprising:

obtaining a second image of the sporting event, the second image containing the sporting projectile at a second pixel position and a third and fourth line separated by the predetermined real-world distance in the direction;

establishing the number of pixels between the third and fourth line in the direction;

establishing the real-world distance represented by a pixel in the direction;

establishing the number of pixels between the second pixel position and the third line in the direction;

determining the real-world position of the sporting projectile in the sporting event in accordance with the established real-world distance and the number of pixels between the second pixel position and the second line; and determining the distance travelled by the sporting projectile between the first and second image in accordance with the difference between the real-world position of the sporting projectile in the first image and the real-world position of the sporting projectile in the second image.

3. A method according to clause 2, further comprising:

generating a notification when the distance travelled by the sporting projectile between the first and second image is greater than, or equal to a predetermined threshold.

4. A method according to clause 4, wherein the predetermined threshold is 10 yards.

5. A method according to any one of clauses 1 to 5, further comprising:

identifying the first pixel by:

fitting a shape to the outline of the sporting projectile;

establishing the centre of the shape;

establishing a vertical projection between the a location in the shape and a surface upon which the sporting event is played; and identifying the intersection of the vertical projection and the surface.

6. A method comprising:

obtaining a first image of a sporting event, the first image being a perspective view containing a sporting projectile at a first pixel position and a first, second and third line each separated by a predetermined real-world distance in a direction;

establishing the number of pixels between the first and second line and the first and third line in the direction;

establishing the number of pixels between the first pixel position and the first line in the direction; and determining the real-world position of the sporting projectile in the sporting event in accordance with $$x = \frac{(A''C'' \cdot A''D'')(1 - y)}{A''C'' - yA''D''}$$

Where A"C" is the real-world distance between the first and second line and A"D" is the real-world distance between the first and third line and y=(AC·BD)/(BC·AD) where AC is the number of pixels between the first and second line; BD is the number of pixels between the first pixel position and the third line; BC is the number of pixels between the first pixel position and the second line and AD is the number of pixels between the first line and the third line.

7. A method according to clause 6 further comprising:

obtaining a second image of a sporting event, the second image being a perspective view containing a sporting projectile at a second pixel position and a fourth, fifth and sixth line each separated by the predetermined real-world distance in the direction;

establishing the number of pixels between the fourth and fifth line and the fourth and sixth line in the direction;

establishing the number of pixels between the second pixel position and the fourth line in the direction;

determining the real-world position of the sporting projectile in the sporting event in accordance with $$x = \frac{(A''C'' \cdot A''D'')(1 - y)}{A''C'' - yA''D''}$$

Where A"C" is the real-world distance between the fourth and fifth line and A"D" is the real-world distance between the fourth and sixth line and y=(AC·BD)/(BC·AD) where AC is the number of pixels between the fourth and fifth line; BD is the number of pixels between the second pixel position and the sixth line; BC is the number of pixels between the second pixel position and the fifth line and AD is the number of pixels between the fourth line and the sixth line; and determining the distance travelled by the sporting projectile between the first and second image in accordance with the difference between the real-world position of the sporting projectile in the first image and the real-world position of the sporting projectile in the second image.

8. A method according to clause 7, comprising:

fitting a spline curve to the first, second and third line; and determining the real-world position of the sporting projectile using the fitted spline curves.

9. A method according to clause 8, further comprising:

generating a notification when the distance travelled by the sporting projectile between the first and second image is greater than or equal to a predetermined threshold.

10. A method according to any one of clauses 6 to 9, further comprising:

identifying the first pixel by:

fitting a shape to the outline of the sporting projectile;

establishing the centre of the shape;

establishing a vertical projection between the centre of the shape and a surface upon which the sporting event is played; and identifying the intersection of the vertical projection and the surface.

11. A device comprising circuitry configured to:

obtain a first image of a sporting event, the first image containing a sporting projectile at a first pixel position and a first and second line separated by a predetermined real-world distance in a direction;

establish the number of pixels between the first and second line in the direction;

establish a real-world distance represented by a pixel in the direction;

US 12,688,601 B2

15 establish the number of pixels between the first pixel position and the first line in the direction; and determine the real-world position of the sporting projectile in the sporting event in accordance with the established real-world distance and the number of pixels between the first pixel position and the first line.

12. A device according to clause 11 where the circuitry is further configured to:

obtain a second image of the sporting event, the second image containing the sporting projectile at a second pixel position and a third and fourth line separated by the predetermined real-world distance in the direction;

establish the number of pixels between the third and fourth line in the direction;

establish the real-world distance represented by a pixel in the direction;

establish the number of pixels between the second pixel position and the third line in the direction;

determine the real-world position of the sporting projectile in the sporting event in accordance with the established real-world distance and the number of pixels between the second pixel position and the second line; and determine the distance travelled by the sporting projectile between the first and second image in accordance with the difference between the real-world position of the sporting projectile in the first image and the real-world position of the sporting projectile in the second image.

13. A device according to clause 12, wherein the circuitry is further configured to:

generate a notification when the distance travelled by the sporting projectile between the first and second image is greater than, or equal to a predetermined threshold.

14. A device according to any one of clauses 11 to 13, wherein the circuitry is further configured to:

identify the first pixel by:

fitting a shape to the outline of the sporting projectile;

establishing the centre of the shape;

establishing a vertical projection between the a location in the shape and a surface upon which the sporting event is played; and identifying the intersection of the vertical projection and the surface.

15. A device comprising circuitry configured to:

obtain a first image of a sporting event, the first image being a perspective view containing a sporting projectile at a first pixel position and a first, second and third line each separated by a predetermined real-world distance in a direction;

establish the number of pixels between the first and second line and the first and third line in the direction;

establish the number of pixels between the first pixel position and the first line in the direction; and determine the real-world position of the sporting projectile in the sporting event in accordance with $$x = \frac{(A''C'' \cdot A''D'')(1 - y)}{A''C'' - yA''D''}$$

Where A"C" is the real-world distance between the first and second line and A"D" is the real-world distance between the first and third line and y=(AC·BD)/(BC·AD) where AC is the number of pixels between the first and second line; BD is the number of pixels between the first pixel position and the third line; BC is the number of pixels between the first pixel position and the second line and AD is the number of pixels between the first line and the third line.

16. A device according to clause 15 wherein the circuitry is further configured to:

obtain a second image of a sporting event, the second image being a perspective view containing a sporting projectile at a second pixel position and a fourth, fifth and sixth line each separated by the predetermined real-world distance in the direction;

establish the number of pixels between the fourth and fifth line and the fourth and sixth line in the direction;

establish the number of pixels between the second pixel position and the fourth line in the direction;

determine the real-world position of the sporting projectile in the sporting event in accordance with $$x = \frac{(A''C'' \cdot A''D'')(1 - y)}{A''C'' - yA''D''}$$

Where A"C" is the real-world distance between the fourth and fifth line and A"D" is the real-world distance between the fourth and sixth line and y=(AC·BD)/(BC·AD) where AC is the number of pixels between the fourth and fifth line; BD is the number of pixels between the second pixel position and the sixth line; BC is the number of pixels between the second pixel position and the fifth line and AD is the number of pixels between the fourth line and the sixth line; and determine the distance travelled by the sporting projectile between the first and second image in accordance with the difference between the real-world position of the sporting projectile in the first image and the real-world position of the sporting projectile in the second image.

17. A device according to clause 16, wherein the circuitry is configured to:

fit a spline curve to the first, second and third line; and determine the real-world position of the sporting projectile using the fitted spline curves.

18. A device according to clause 17, wherein the circuitry is further configured to:

generate a notification when the distance travelled by the sporting projectile between the first and second image is greater than or equal to a predetermined threshold.

19. A device according to any one of clauses 15 to 18, wherein the circuitry is further configured to:

identify the first pixel by:

fitting a shape to the outline of the sporting projectile;

establishing the centre of the shape;

establishing a vertical projection between the centre of the shape and a surface upon which the sporting event is played; and identifying the intersection of the vertical projection and the surface.

20. A computer program product comprising computer readable instructions which, when loaded onto a computer, configures the computer to perform a method comprising:

obtaining a first image of a sporting event, the first image containing a sporting projectile at a first pixel position and a first and second line separated by a predetermined real-world distance in a direction;

establishing the number of pixels between the first and second line in the direction;

establishing a real-world distance represented by a pixel in the direction;

establishing the number of pixels between the first pixel position and the first line in the direction; and determining the real-world position of the sporting projectile in the sporting event in accordance with the established real-world distance and the number of pixels between the first pixel position and the first line

What is claimed is:

1. A method comprising:

obtaining a first image of a sporting event, the first image containing a sporting projectile at a first pixel position and a first and second line separated by a predetermined real-world distance in a direction;

establishing the number of pixels between the first and second line in the direction;

establishing a real-world distance represented by a pixel in the direction;

establishing the number of pixels between the first pixel position and the first line in the direction; and determining the real-world position of the sporting projectile in the sporting event in accordance with the established real-world distance and the number of pixels between the first pixel position and the first line.

2. The method according to claim 1, further comprising:

obtaining a second image of the sporting event, the second image containing the sporting projectile at a second pixel position and a third and fourth line separated by the predetermined real-world distance in the direction;

establishing the number of pixels between the third and fourth line in the direction;

establishing the real-world distance represented by a pixel in the direction;

establishing the number of pixels between the second pixel position and the third line in the direction;

determining the real-world position of the sporting projectile in the sporting event in accordance with the established real-world distance and the number of pixels between the second pixel position and the second line; and determining the distance travelled by the sporting projectile between the first and second image in accordance with the difference between the real-world position of the sporting projectile in the first image and the real-world position of the sporting projectile in the second image.

3. The method according to claim 2, further comprising:

generating a notification when the distance travelled by the sporting projectile between the first and second image is greater than, or equal to a predetermined threshold.

4. The method according to claim 3, wherein the predetermined threshold is 10 yards.

5. The method according to claim 1, further comprising:

identifying the first pixel by:

fitting a shape to the outline of the sporting projectile;

establishing the centre of the shape;

establishing a vertical projection between a location in the shape and a surface upon which the sporting event is played; and identifying the intersection of the vertical projection and the surface.

6. A method comprising:

obtaining a first image of a sporting event, the first image being a perspective view containing a sporting projectile at a first pixel position and a first, second and third line each separated by a predetermined real-world distance in a direction;

establishing the number of pixels between the first and second line and the first and third line in the direction;

establishing the number of pixels between the first pixel position and the first line in the direction; and determining the real-world position of the sporting projectile in the sporting event in accordance with $$x = \frac{(A''C'' \cdot A''D'')(1-y)}{A''C'' - yA''D''}$$

where A"C" is the real-world distance between the first and second line and A"D" is the real-world distance between the first and third line and y=(AC·BD)/(BC·AD) where AC is the number of pixels between the first and second line; BD is the number of pixels between the first pixel position and the third line; BC is the number of pixels between the first pixel position and the second line and AD is the number of pixels between the first line and the third line.

7. The method according to claim 6 further comprising:

obtaining a second image of a sporting event, the second image being a perspective view containing a sporting projectile at a second pixel position and a fourth, fifth and sixth line each separated by the predetermined real-world distance in the direction;

establishing the number of pixels between the fourth and fifth line and the fourth and sixth line in the direction;

establishing the number of pixels between the second pixel position and the fourth line in the direction;

determining the real-world position of the sporting projectile in the sporting event in accordance with $$x = \frac{(A''C'' \cdot A''D'')(1-y)}{A''C'' - yA''D''}$$

where A"C" is the real-world distance between the fourth and fifth line and A"D" is the real-world distance between the fourth and sixth line and y=(AC·BD)/(BC·AD) where AC is the number of pixels between the fourth and fifth line; BD is the number of pixels between the second pixel position and the sixth line; BC is the number of pixels between the second pixel position and the fifth line and AD is the number of pixels between the fourth line and the sixth line; and determining the distance travelled by the sporting projectile between the first and second image in accordance with the difference between the real-world position of the sporting projectile in the first image and the real-world position of the sporting projectile in the second image.

8. The method according to claim 7, comprising:

fitting a spline curve to the first, second and third line; and determining the real-world position of the sporting projectile using the fitted spline curves.

9. The method according to claim 8, further comprising:

generating a notification when the distance travelled by the sporting projectile between the first and second image is greater than or equal to a predetermined threshold.

10. The method according to claim 6, further comprising:

identifying the first pixel by:

fitting a shape to the outline of the sporting projectile;

establishing the centre of the shape;

establishing a vertical projection between the centre of the shape and a surface upon which the sporting event is played; and identifying the intersection of the vertical projection and the surface.

11. A device comprising circuitry configured to:

obtain a first image of a sporting event, the first image containing a sporting projectile at a first pixel position and a first and second line separated by a predetermined real-world distance in a direction;

establish the number of pixels between the first and second line in the direction;

establish a real-world distance represented by a pixel in the direction;

establish the number of pixels between the first pixel position and the first line in the direction; and determine the real-world position of the sporting projectile in the sporting event in accordance with the established real-world distance and the number of pixels between the first pixel position and the first line.

12. The device according to claim 11 where the circuitry is further configured to:

obtain a second image of the sporting event, the second image containing the sporting projectile at a second pixel position and a third and fourth line separated by the predetermined real-world distance in the direction;

establish the number of pixels between the third and fourth line in the direction;

establish the real-world distance represented by a pixel in the direction;

establish the number of pixels between the second pixel position and the third line in the direction;

determine the real-world position of the sporting projectile in the sporting event in accordance with the established real-world distance and the number of pixels between the second pixel position and the second line; and determine the distance travelled by the sporting projectile between the first and second image in accordance with the difference between the real-world position of the sporting projectile in the first image and the real-world position of the sporting projectile in the second image.

13. The device according to claim 12, wherein the circuitry is further configured to:

generate a notification when the distance travelled by the sporting projectile between the first and second image is greater than, or equal to a predetermined threshold.

14. The device according to claim 11, wherein the circuitry is further configured to:

identify the first pixel by:

fitting a shape to the outline of the sporting projectile;

establishing the centre of the shape;

establishing a vertical projection between a location in the shape and a surface upon which the sporting event is played; and identifying the intersection of the vertical projection and the surface.

15. The method of claim 1, wherein the first line and the second line are previously detected and labeled, and wherein labels respectively associated with the first line and the second line are stored with the first image.

* * * * *